Patented Apr. 3, 1951

2,547,819

UNITED STATES PATENT OFFICE 2,547,819

VINYL ETHER-TRI- OR TETRACHLORO-ETHYLENE INTERPOLYMERIZATION PRODUCTS AND PROCESS OF PRODUCING THE SAME

Frederick Grosser, Easton, Pa., assignor to General Aniline & Film Corporation, New York, N. Y., a corporation of Delaware No Drawing. Application November 29, 1945,
Serial No. 631,778

8 Claims. (Cl. 260—87.5)

The present invention relates to novel interpolymerization products of vinyl or other ethylenically-unsaturated ethers with trihaloethylene and its derivatives and a process of producing the same.

I have discovered that new and useful interpolymerization products are obtained when an ethylenically-unsaturated ether and trihaloethylene and its derivatives are interpolymerized. These new interpolymers vary in color from light yellow or amber to dark brown and in consistency from viscous, tacky liquids which are soluble in a wide variety of organic solvents, to soft, tacky, rubbery solids which are insoluble in the common organic solvents. These new interpolymers are compatible with a wide variety of organic polymeric or resinous materials and are useful as modifiers, extenders and stiffening agents for solid organic polymers.

As ethylenically-unsaturated ethers which are suitable for use in the present invention, may be cited those ethers having the formula $$R-O-CR'=CR^2R^3$$

in which R, R', R$^2$ and R$^3$ stand for an alkyl, aryl or aralkyl group and R', R$^2$ or R$^3$ also may be hydrogen. Specific examples of such ethers are the vinyl ethers of such aliphatic alcohols as methyl, ethyl, propyl, isopropyl, butyl, isobutyl, cyclohexyl, lauryl and stearyl alcohol or of such organic hydroxy compounds as phenol, cresol, benzyl alcohol, cinnamic alcohol and the like. As examples of ethylenically-unsaturated ethers in which R', R$^2$ or R$^3$ is an alkyl, aryl, or aralkyl group, may be mentioned the ethers of propenyl, butenyl, beta-phenyl, beta-benzyl and similar alcohols with the alkyl, aryl, or aralkyl alcohols mentioned above.

Trihaloethylene and its derivatives which are suitable for use in this invention may be represented by the following general formula:

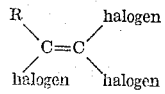

in which R stands for hydrogen, halogen, or an alkyl or aryl group. Specific compounds of this type are trichloroethylene, tetrachloroethylene, 1,1,2-trichloro-propylene or -butylene or their higher homologues, 2-phenyl - 1,1,2 - trichloroethylene, etc.

The polymerization of the present invention may readily be carried out by heating a mixture of one of the above-mentioned ethylenically-unsaturated ethers and trihaloethylene or its derivatives, preferably in a closed system and in the presence of an oxygen-supplying polymerization catalyst. Particularly suitable as catalysts for the polymerization are such organic peroxides as benzoyl peroxide and lauroyl peroxide. Such oxygen-supplying polymerization catalysts are employed in relatively small amounts up to a few per cent, generally within the range of 1 to 5% by weight, based on the amount of monomeric compounds to be polymerized. If desired, the polymerization may be carried out in the presence of inert organic diluents such as chloroform, benzene, toluene, petroleum naphtha and the like.

The temperature employed during polymerization is not highly critical and may be varied through a relatively wide range. In general, temperatures of from 50 to 60° C. are satisfactory and permit the polymerization to be carried out in a reasonable time with a good yield of relatively high polymer.

While none of the monomers employed in the present invention is readily polymerizable itself under the conditions employed for producing these novel interpolymers, I have found that the mixed monomers may be readily polymerized and that the relative proportions of the ethylenically-unsaturated ether and trihaloethylene or its derivatives may be varied through a relatively wide range. In general, I prefer to employ a molar ratio of ethylenically-unsaturated ether to trihaloethylene or its derivatives within the range of 10:1 and preferably 4:1 to 1:4. The exact proportion of the two monomers which should be employed will vary with the type of polymer which is desired. In general, when a relatively high proportion of ethylenically-unsaturated ether is employed, the products obtained are harder solids and posses a relatively small amount of tack, while when the relative amount of trihaloethylene or its derivatives is increased, the resulting interpolymers are softer and more tacky and liquid, viscous liquids generally being obtained when the ratio of ether to halogenated compound is 1:4. The yield also tends to decrease as the amount of halogenated compound is increased.

The following specific examples illustrate preferred embodiments of the present invention:

*Example 1*

Vinyl isopropyl ether and trichloroethylene were mixed together in a molar ratio of 4:1 and the mixture heated in the presence of 1.8% of lauroyl peroxide to 50 to 55° C. for 25 hours. A yield of 50% of a dark brown, tacky, rubbery solid which was insoluble in benzene, methyl ethyl ketone, chloroform and other common organic solvents was obtained.

*Example 2*

A mixture of n-butyl-vinyl ether and trichloroethylene having a molar ratio of 4:1 was heated to a temperature of 50 to 55° C. in the presence of 2% lauroyl peroxide for 16 hours. There was obtained 82% of a light yellow, soft, tacky solid which was soluble in methyl ethyl ketone and benzene and other aromatics but insoluble in acetone, methanol and ethanol.

The foregoing experiment was repeated, using an equimolar mixture of n-butyl-vinyl ether and trichloroethylene. After heating for 40 hours at 50 to 55° C. in the presence of 2% lauroyl peroxide, there was obtained a yield of 29% of an amber, viscous liquid which was soluble in methyl ethyl ketone, benzene and other aromatic solvents.

The foregoing experiment was repeated, using a mixture of n-butyl-vinyl ether and trichloroethylene in a molar ratio of 1:4. After heating this mixture for 40 hours to a temperature of 50 to 55° C. in the presence of 2% lauroyl peroxide, a yield of 19% of a dark brown, viscous liquid which was soluble in methyl ethyl ketone, benzene and other aromatic solvents was obtained.

*Example 3*

A mixture of n-butyl-vinyl ether and tetrachloroethylene in a molar ratio of 4:1 was heated for 16 hours to a temperature of 50 to 55° C. in the presence of 2% lauroyl peroxide. A yield of 62% of a dark brown, tacky, rubbery solid insoluble in methyl ethyl ketone and benzene was obtained.

The foregoing experiment was repeated, using an equipmolar mixture of n-butyl-vinyl ether and tetrachloroethylene. After heating the mixture for 16 hours to a temperature of 50 to 55° C. in the presence of 2% lauroyl peroxide, a yield of 37% of a dark brown, tacky, rubbery solid which was insoluble in methyl ethyl ketone and benzene was obtained.

The foregoing experiment was repeated, using a mixture of n-butyl-vinyl ether and tetrachloroethylene in a molar ratio of 1:4. After heating for 40 hours to a temperature of 50 to 55° C. in the presence of 2% lauroyl peroxide, a yield of 14% of an amber, viscous liquid soluble in benzene and methyl ethyl ketone but insoluble in acetone and methanol was obtained.

I claim:
1. The method of polymerization which comprises heating to a temperature of 50–60° C. in the presence of an oxygen-supplying polymerization catalyst a mixture of isopropyl vinyl ether and trichloroethylene in molar proportions of 1:4 to 4:1.
2. The interpolymerization products obtained in accordance with claim 1.
3. The method of polymerization which comprises heating to a temperature of 50–60° C. in the presence of an oxygen-supplying polymerization catalyst a mixture of n-butyl vinyl ether and trichloroethylene in molar proportions of 1:4 to 4:1.
4. The interpolymerization products obtained in accordance with claim 3.
5. The method of polymerization which comprises heating to a temperature of 50–60° C. in the presence of an oxygen-supplying polymerization catalyst a mixture of n-butyl vinyl ether and tetrachloroethylene in molar proportions of 1:4 to 4:1.
6. The interpolymerization products obtained in accordance with claim 5.
7. The method of polymerization which comprises heating to a temperature of 50–60° C. in the presence of an oxygen supplying polymerization catalyst, a mixture of a vinyl ether of an alkanol having from 1 to 4 carbon atoms and a chlorinated ethylene selected from the group consisting of trichloroethylene and tetrachloroethylene in molar proportions of 1:4 to 4:1.
8. The interpolymerization products obtained in accordance with claim 7.

FREDERICK GROSSER.

REFERENCES CITED

The following references are of record in the file of this patent:

UNITED STATES PATENTS

| Number | Name | Date |
| --- | --- | --- |
| 2,160,943 | Britton | June 6, 1939 |
| 2,328,510 | Thomas | Aug. 31, 1943 |
| 2,388,225 | Brooks et al. | Oct. 30, 1945 |
| 2,393,967 | Brubaker | Feb. 5, 1946 |
| 2,397,724 | Cass | Apr. 2, 1946 |
| 2,408,402 | Arnold | Oct. 1, 1946 |
| 2,468,664 | Hanford et al. | Apr. 26, 1949 |